Jan. 17, 1967 R. E. DAVIES 3,298,874
EXPENDABLE IMMERSION TEMPERATURE RESPONSIVE UNIT
Filed May 10, 1962 2 Sheets-Sheet 1

United States Patent Office 3,298,874
Patented Jan. 17, 1967

3,298,874
EXPENDABLE IMMERSION TEMPERATURE
RESPONSIVE UNIT
Roy E. Davies, Roslyn, Pa., assignor to Leeds & Northrup
Company, Philadelphia, Pa., a corporation of Pennsylvania
Filed May 10, 1962, Ser. No. 193,706
18 Claims. (Cl. 136—232)

This invention relates to expendable immersion temperature responsive units and has for an object the provision of a molded plastic housing which provides support for the temperature responsive device. This invention further relates to improvements in expendable immersion thermocouple units of the type disclosed in Mead Patent No. 2,999,121.

In the Mead patent there was disclosed an expendable prefabricated thermocouple unit which may be easily and rapidly connected for making immersion temperature measurements such for example as the temperature of molten metal in open hearth furnaces. After immersion in the bath of molten metal and the taking of a temperature measurement, the unit is discarded and replaced by another similar precalibrated unit. In carrying out the present invention, there is provided a low cost molded plastic support structure or housing for the temperature responsive device having a number of novel and desirable features as hereinafter described.

In accordance with one aspect of the present invention, there is provided a temperature responsive unit including an improved housing comprising a body having a thin-walled cup portion at one end thereof, the body having an extension carried by a wall of the cup portion for supporting a temperature responsive device. A temperature responsive device is supported by the extension and projects outwardly of the cup portion. Electrical conductors, which may form part of the temperature responsive device or are of different material, are electrically connected to the temperature responsive device and extend through the end wall of the cup portion to the other side thereof. Electrical insulating material is disposed within the cup portion forming a seal therein for retaining the temperature responsive device in fixed relation with respect to the body.

The body is a one piece molded plastic part preferably made from high impact polystyrene because of its mechanical strength, ease of molding and relatively low cost. The body or housing is further characterized in one form thereof in having a thin-walled tubular extension at the other end thereof from the cup portion and projecting from the exterior of the end wall of the cup portion. Radially disposed web portions or fins connect the exterior wall of the tubular extension with the end wall of the cup portion and serve to impart to the housing additional strength and enhanced rigidity while at the same time reducing the amount of material required in the formation of the plastic body. In the preferred form of the invention, the electrical insulating material within the cup portion comprises soldified cement material which interlocks with inwardly extending protuberance structure within the cup portion forming a seal therewith and with the temperature responsive device and retaining the latter in fixed relation with respect to the body.

Further in accordance with the invention, there is provided the subcombination of a support for a temperature responsive unit having a molded plastic body including a thin-walled cup portion and an integral support portion extending from a wall of the cup portion, the support portion including structure for holding a temperature responsive device in outwardly projecting relation with respect to the cup portion.

For further objects and advantages of the invention, references may be had to the following description taken in conjunction with the accompanying drawings, in which.

Figure 1:
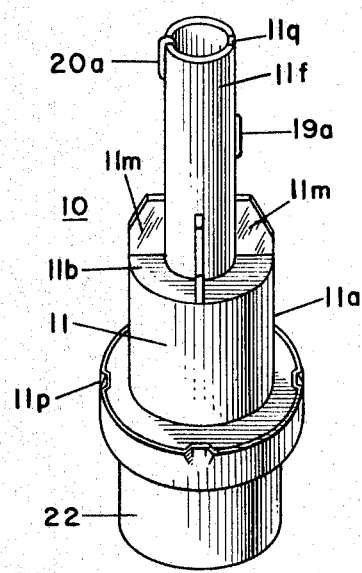
FIG. 1 is a perspective view of a temperature responsive unit embodying the present invention.

Referring to FIG. 1, there is shown a temperature responsive unit 10 utilizing a molded plastic body 11 in accordance with the present invention. As may be seen in FIG. 2, the body 11 includes a thin-walled cup portion 11a. The cup portion is illustrated in an inverted position so that the bottom or transverse end wall 11b of the cup portion is above the open end of the cup. The cup portion 11a is adapted to receive a temperature responsive device 12. The temperature responsive device 12 is adapted to be held by an extension 11c which is carried by the transverse wall 11b of the body. The temperature responsive device has been illustrated in the form of a thermocouple 13 which comprises a pair of serially connected thermocouple wires 14 and 15 joined together to form a hot junction 16. The thermocouple wires 14 and 15 and the hot junction 16 are encased in electrical insulating heat-transmitting material which may take the form of a bent quartz tube 17. A thermocouple assembly of this type is disclosed and claimed in Mead Patent No. 2,999,121. The tube 17 is adapted to be held by the extension 11c during filling of the cup 11a with a refractory cement 18. The outer end of the extension 11c is substantially C-shaped to receive and hold one leg of the bent tube 17. A slot 11c' is provided in the outer end to increase the flexibility. A shoulder 11c'' is provided at the inner end of the slot to serve as a stop in limiting the amount of insertion of the leg of tube 17. The free ends of the thermocouple wires 14 and 15 are electrically connected to electrical conductors 19 and 20 which extend through the end wall 11b of the cup for connection to a suitable measuring circuit.

Figure 2:
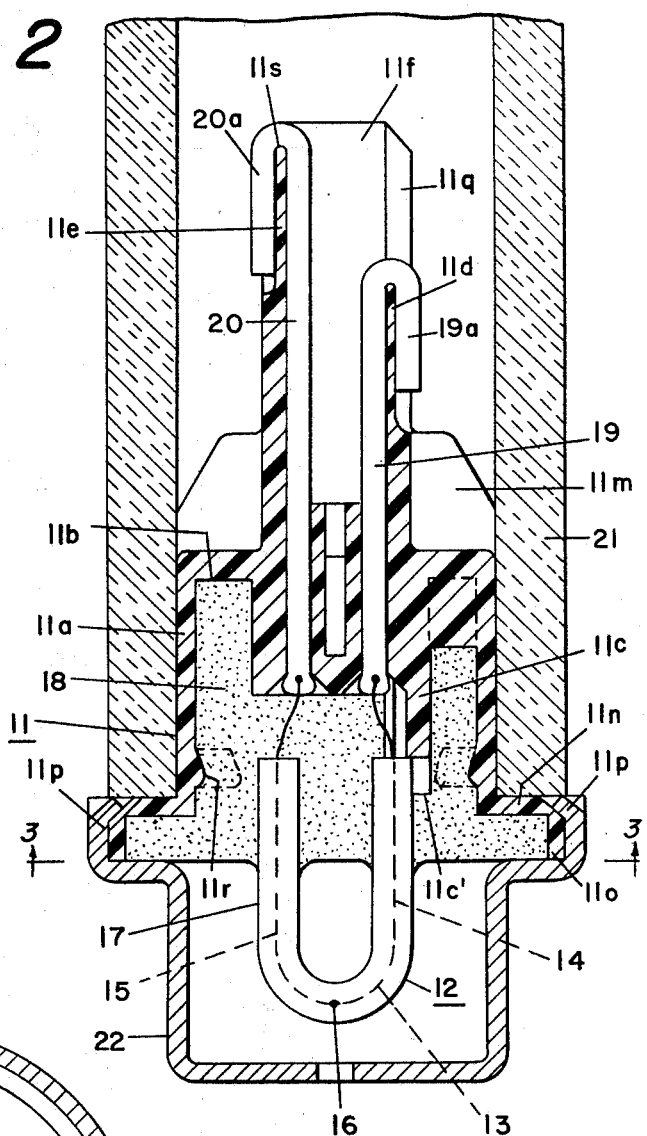
FIG. 2 is a sectional view of the unit shown in FIG. 1 inserted in the end of a tube of heat insulating material.

As illustrated in FIG. 2, the electrical conductors 19 and 20 preferably comprise compensating lead wire material, the free ends of which are bent over through a deep slot 11q and a short slot 11s, respectively, and provide contact portions 19a and 20a. The bent portions 19a and 20a are received in recessed structures in the form of shallow grooves 11d and 11e on the outside of a thin-walled tubular extension 11f which projects from the exterior of the end wall 11b of the cup portion 11a. The contact portions 19a and 20a are similar to those shown in FIG. 8 of co-pending application Serial No. 837,464, filed September 1, 1959 by Kenneth B. Parker, Jr., a co-employee of applicant, issued August 7, 1962, as United States Patent No. 3,048,642. Due largely to the existence of the deep slot 11q which properly locates the contact 19a, the thin-walled tubular extension 11f in the present application provides the resilient back-up structure for the contact portions 19a and 20a. The tubular extension 11f and the contact portions 19a and 20a are adapted to be received in the mating end of a manipulator similar to that disclosed in FIG. 8 of the aforesaid Parker application. The manipulator is in turn connected to a suitable temperature measuring system.

Figure 3:
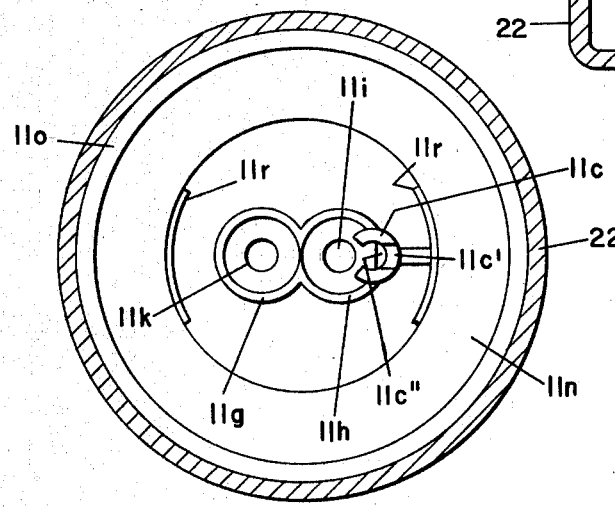
FIG. 3 is a view taken along the lines 3—3 in FIG. 2 with the temperature sensitive device and refractory cement omitted for clarity.

The end wall 11b includes tubular reinforcing bosses 11g and 11h, FIG. 3, having central passages 11i and 11k extending therethrough for receiving the respective electrical conductors 19 and 20. A plurality of fins 11m, FIGS. 1 and 2, are formed integral with the exterior of the thin-walled tubular extension 11f and the exterior of the bottom or end wall 11b. The fins 11m provide rigidity for the tubular extension and aid in guiding the unit 10 into the end of a tube 21 of heat insulating material, FIG. 2. The open end of the cup portion 11a is provided with a flange 11n and a rim portion 11o. The flange portion 11n is adapted to abut against the end of the heat insulating tube 21 as shown in FIG. 2. The exterior cylindrical surface of the cup portion 11a is tapered slightly to fit like a plug in the end of the tube 21. A protective cap 22 is adapted to surround the outwardly projecting portion of the thermocouple 13 with the cap being secured to the combined flange 11n and rim 11o of the body 11. The exterior of the flange 11n has a plurality of notches 11p into which the rim of the metal cap 22 is deformed. Alternatively, the entire rim may be chamfered and portions or the entire edge of the cap may be deformed into engagement therewith. The protective cap 22 is of the type disclosed in the aforesaid Mead patent and preferably is made from a thin metal material so that it will melt or be consumed rapidly during immersion in a molten bath, the temperature of which is being measured.

The body 11 is of single piece construction and thus can be economically produced in multi-cavity molds. Although the temperatures which are being measured frequently are in the order of 3000° F. and above, the body 11 may be made from a plastic material having a substantially lower melting point. The reason for this is the fact that heat insulating tube 21 which preferably is made from hard paper or equivalent material insulates the plastic body from the molten bath for the short period of time required for the thermocouple 13 to obtain a temperature measurement. Cooperating with the heat insulating tube 21 is the refractory cement 18 which fills the cup portion 11a, FIG. 2, and itself forms a rigid body having electrical and heat insulating properties. Various suitable cements known to those skilled in the art may be used.

It will be noted in FIG. 2 that the wall structure throughout the body 11 is maintained thin thus utilizing a minimum of plastic. This enables body members 11 to be more easily molded and likewise minimizes the amount of plastic material used thereby minimizing the overall cost of production. Due to the cooperation of the heat insulating tube 21 and the refractory cement 18, the plastic material utilized for the body may have a softening point below 200° F. and a melting point as low as about 400° F. Various plastic materials such as nylon, polyethylene and Bakelite may be used; however, applicant prefers to use a high impact polystyrene because of its mechanical strength, ease of molding and low cost. It is also to be understood that other plastic materials may be used. The refractory cement 18 is adapted to be retained in the cup portion 11a by means of an inwardly extending protuberance 11r which extends almost entirely around the inner circumference of the cup portion 11a, FIG. 2. The protuberance 11r may constitute a plurality of short elements so long as structure is provided which interlocks with the cement 18 when the latter solidifies and thus retains the cement 18 in place and the thermocouple having its ends embedded therein.

Figure 4:
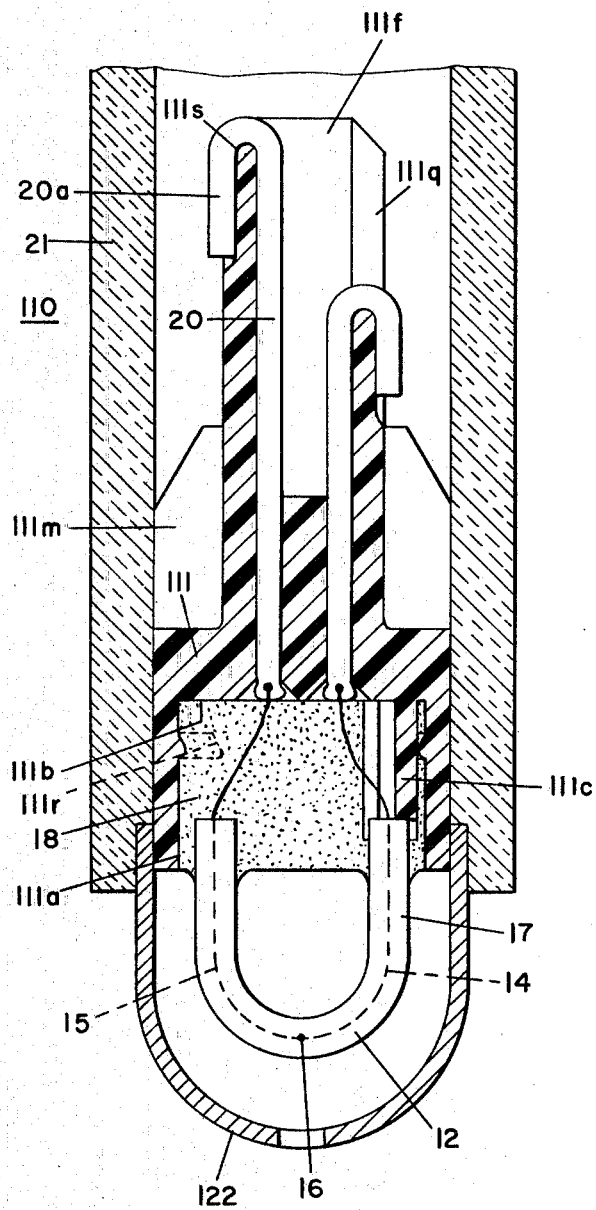
FIG. 4 is a sectional view of a modification of the invention.

Referring to FIG. 4, there is shown a modification of a temperature responsive unit embodying the invention. The unit 110 is similar to the unit 10 shown in FIGS. 1–3 and corresponding parts have been identified with corresponding reference characters increased by one hundred. The molded plastic body 111 shown in FIG. 4 includes a cup portion 111a, having an end wall 111b from which projects within the cup a support 111c for the thermocouple device 12, the latter being identical with the one illustrated in FIG. 2. As will be seen, the support 111c engages one of the legs of the U-shaped quartz tubes 17. The thermocouple elements 14 and 15 are joined together at the hot junction 16 and the free ends of the thermocouple elements are connected within the body 111 to the lower ends of the compensating extension lead wires 19 and 20. The upper ends of the lead wires 19 and 20 extend through a tubular extension 111f which is at the opposite end of the body 111. The integral fins 111m which extend radially from the end wall of the cup and along the tubular portion 111f serve to impart to the structure additional strength and enhanced rigidity while at the same time reducing the amount of material required in the formation of the plastic body 111. Thus, the fins 111m function in the same manner as fins 11m in the previous embodiment. The upper ends of the extension wires 19 and 20 are provided with contact portions 19a and 20a respectively.

While the foregoing portions of the body 111 in FIG. 4 are similar to the corresponding portions in the embodiment described in FIGS. 1–3, it will be noted that the open end on the cup portion 111a terminates in a straight edge rather than in a flange. With this construction, the protective cap 122 will extend over the open end of the cup portion 111a and be received within the open end of the heat insulating tube 21. The cup portion 111a is adapted to be filled with a refractory cement 18 which when solidified interlocks with the inwardly extending protuberance 111r, the latter extending around the inner surface of the wall of the cup portion 111a. The protective cap 122 preferably is made from thin sheet metal and is pressed into the end of the heat insulating tube 21 along with the body member 111. Both the body member 111 and the cap 122 are thus retained within the end of tube 21 by friction. The construction shown in FIG. 4 not only eliminates the flange and rim illustrated in FIG. 2 but enables the cardboard or heat insulating tube 21 to more completely insulate the molded plastic body 111 from the molten bath during immersion. The rim of the cup portion 111a may be undercut a few thousandths of an inch for a distance of about three-sixteenths of an inch in order that the outside diameter of cap 122 will be substantially flush with the outside diameter of the cup portion 111a. Instead of relying on a friction fit for the cap, it may be struck with a sharp pointed tool to form dimples holding the cap to the cup.

Figure 5:
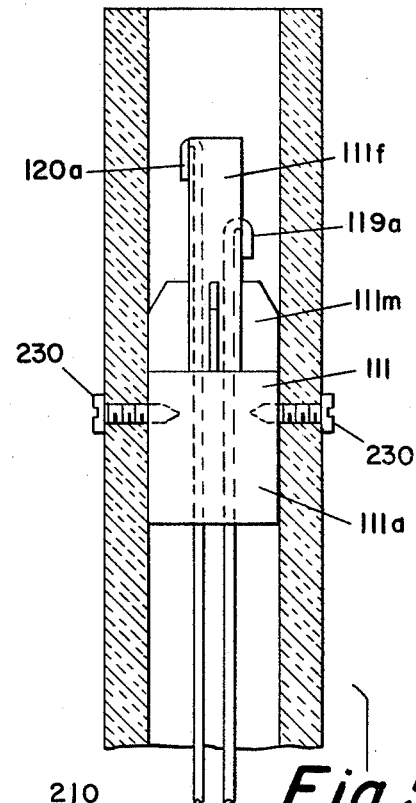
FIG. 5 is a sectional view of a further modification of the invention.
Figure 5:
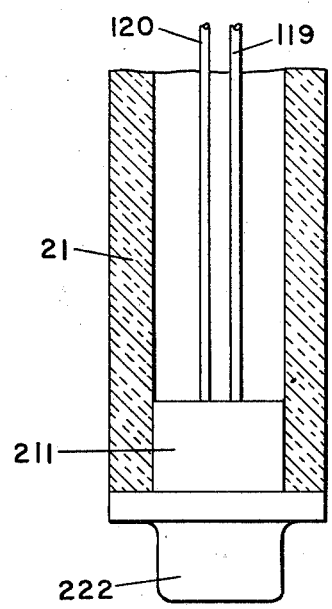

Referring to FIG. 5, there is shown a further modification of the invention. In FIG. 5, there is shown a temperature responsive unit 210 utilizing certain features of the embodiments described and illustrated in connection with FIGS. 1–3 and 4.

At the lower end of the cardboard tube 21, there is provided a cup-shaped molded plastic body 211 which is similar to the cup portion 11a shown in FIG. 2. The inner construction of the cup 211 is identical with that in FIG. 2 and thus it is not believed necessary to repeat the description here. It is believed sufficient to state that it includes a thermocouple or other heat sensing device 12 (not shown in FIG. 5) within the protective cap 222. The tubular extension 11f of the body in FIG. 2 along with the fins 11m have been omitted from the body 211 in FIG. 5 and instead the lead wire extensions 119 and 120 extend through the cardboard tube 21 toward the upper end thereof where they are received in the molded plastic body member 111 of the type shown in cross section in FIG. 4. The free ends of the lead wires 119 and 120 extend into the thin-walled tubular extension 111f and are bent over to provide the contact portions 119a and 120a respectively. The body 111 in FIG. 5 is located at the upper end of a cardboard tube 21 of any selected length by suitable means such for example as screws 230. With this arrangement, it is not necessary to fill the cup portion 111a in FIG. 5 with cement. It is to be understood, however, that the cup 211 at the bottom of the cardboard tube (FIG. 5) is filled with a refractory cement 18 in the same manner as illustrated in FIG. 2. With the modification illustrated in FIG. 5 it is to be understood that the contacts 119a and 120a will be out of the molten bath when a temperature measurement is made, the cardboard tube 21 being of sufficient length to accomplish this. In the embodiments illustrated in FIGS. 1–3 and FIG. 4, the overall length of the molded plastic bodies 11 and 111 is relatively short for example in the order of three inches and thus the contacts 19a and 20a will ordinarily be immersed below the surface of the molten bath when a temperature measurement is made.

While the cup-shaped body member 211 in FIG. 5 has been illustrated and described as being of similar construction to the cup-shaped portion 11a of FIG. 2, it is to be understood that it may be identical thereto or may be made like the cup-shaped portion 111a in FIG. 4 where the flange and rim of the cup are omitted. In the latter case, the protective cap would be of the type 122 shown in FIG. 4 which would extend inside of the end of the cardboard tube 21.

It shall be understood the invention is not limited to the specific arrangements shown, and that changes and modifications may be made within the scope of the appended claims.

What is claimed is:

1. An expendable immersion temperature responsive unit comprising a body having a cup portion, said cup portion being open at one end and having a transverse end wall at the other end of said cup portion, said body having an extension carried by the interior surface of said cup portion and extending in the direction of the open end of said cup portion, said extension including means for holding a temperature responsive device, a temperature responsive device held in position by said holding means and projecting outwardly from the open end of said cup portion, electrical conductors electrically connected to said temperature responsive device and extending through said end wall of said cup portion to the other side thereof, and electrical insulating material within said cup portion forming a seal therewith for retaining said temperature responsive device in fixed relation with respect to said body.

2. An expendable immersion temperature responsive unit comprising a body having a cup portion at one end thereof, said cup portion being open at one end and having a transverse end wall at the other end of said cup portion, said body having a thin-walled tubular extension at the opposite end thereof projecting from the exterior of said end wall of said cup portion, said body having a second extension carried in said cup portion by one of said walls of said cup portion, said second extension including means for holding a temperature responsive device, a temperature responsive device held in position by said holding means and projecting outwardly from the open end of said cup portion, electrical conductors electrically connected to said temperature responsive device and extending through said end wall of said cup portion and into said tubular extension at the opposite end of said body, and electrical insulating material within said cup portion forming a seal therewith for retaining said temperature responsive device in fixed relation with respect to said body.

3. A temperature responsive unit according to claim 1 wherein said extension is carried by the interior surface of said end wall of said cup portion.

4. A temperature responsive unit according to claim 1 wherein said cup portion at said open end thereof includes as an integral part thereof a flange with an annular rim, and said electrical insulating material substantially fills said rim.

5. A temperature responsive unit according to claim 2 wherein said tubular extension includes recess structure in the exterior surface thereof for receiving the terminal ends of said conductors.

6. A temperature responsive unit according to claim 1 wherein said cup portion includes as an integral part thereof an inwardly extending protuberance cooperating with said electrical insulating material for retaining the latter within said cup portion.

7. An expendable thermocouple unit comprising a body having a cup portion at one end thereof, said cup portion being open at one end and having a transverse end wall at the other end of said cup portion, said body having a thin-walled tubular extension at the opposite end thereof and projecting from the exterior surface of said end wall of said cup portion, said body having a second extension carried by one of said walls of said cup portion, said second extension including means for holding a thermocouple device, a thermocouple device including a thermocouple disposed in an electrically insulating heat-transmitting tube, said tube being held in position by said holding means and projecting outwardly from the open end of said cup portion, electrical conductors electrically connected to said thermocouple and extending through said end wall of said cup portion and into said tubular extension at the opposite end of said body, and electrical insulating refractory cement within said cup portion forming a seal therewith and with said tube of said thermocouple device for retaining said thermocouple device in fixed relation with respect to said body.

8. An expendable thermocouple unit according to claim 7 wherein said tube of said device is bent so as to have spaced apart legs within said cup portion, and at least one of said legs being held by said holding means.

9. An expendable thermocouple unit according to claim 7 wherein the connections between said electrical conductors and said thermocouple are imbedded in said electrical insulating refractory cement.

10. A support for a temperature responsive device comprising a one-piece molded plastic body having a thin-walled cup portion including as integral parts thereof an end wall and side wall at one end thereof, said body having an integral thin-walled tubular extension at the opposite end thereof projecting from the exterior surface of said end wall of said cup portion, radially disposed fin structure connecting the exterior surface of said tubular extension with said end wall of said cup portion, and support structure carried by the interior surface of said cup portion, said structure including means support for holding in position a temperature responsive device.

11. An expendable temperature responsive unit comprising a body having wall structure forming a cup open at one end, holding means on the wall structure of the cup for holding a thermocouple device, said holding means including slot structure having the open end thereof facing in the same direction as the open end of the cup, a thermocouple device projecting outwardly from the open end of said cup and held in position by said holding means with the hot junction of said thermocouple device disposed outside said cup, and electrical conductors extending from said thermocouple device and out through said wall structure of said cup, said electrical conductors being supported by a resilient molded plastic portion of said body and providing electrical contact portions.

12. An expendable temperature responsive unit according to claim 11 wherein said body portion supporting said electrical contact portions is separate and spaced from said cup.

13. A supporting body structure for a temperature responsive unit of the type having a temperature responsive device projecting from the body structure through which electrical conductors extend from the device, the body structure comprising cylindrical wall structure and a transverse wall of material to form a cup having passage means for passing electrical conductors therethrough, an extension projecting from within the cup and carried by the interior surface of a wall of the cup, said extension including means for holding the device in place with respect to the cup prior to filling the cup with electrically insulating material to seal the device in place.

14. An expendable temperature responsive unit comprising a body having a transverse wall adapted to cooperate with cylindrical wall structure to form a cup,
   an extension in the cup carried by the interior surface of a wall of the cup, said extension including means for holding a temperature responsive device, a temperature responsive device projecting out of the cup and held in position by said holding means,
   electrical conductors connected to the said device and extending out through the transverse wall of the cup, and
   a filling of electrically insulating material in the cup sealing the said device in the aforesaid position.

15. An expendable temperature responsive unit according to claim 14 wherein said electrical conductors include contact portions supported by a resilient portion of said body.

16. An expendable temperature responsive unit according to claim 15 wherein said resilient portion of said body supporting said contact portions is separate from and spaced from the cup.

17. An expendable temperature responsive unit comprising a body having transverse wall structure adapted to cooperate with cylindrical wall structure to form a cup,
   holding means projecting from within the cup and carried by the interior surface of a wall thereof for holding a temperature responsive device in predetermined position with respect to the cup prior to filling the cup with an electrically insulating cement,
   an electrically conductive temperature responsive device encased in electrical insulating heat-transmitting material projecting out of the cup and said material being held by said holding means to hold said device in said predetermined position, a filling of electrically insulating cement in the cup sealing said device in said predetermined position, and
   electrical conductors connected to said device and extending through the wall structure of the cup to the other side thereof.

18. An expendable immersion temperature responsive unit comprising a body having a cup portion, said cup portion being open at one end and having a transverse end wall at the other end of said cup portion, said body having an extension projecting from within the cup portion and carried by the interior surface of a wall of said cup portion and extending in the direction of the open end of said cup portion, said extension including means for holding a temperature responsive device, a temperature responsive device held in position by said holding means and projecting outwardly from the open end of said cup portion, and electrical conductors electrically connected to said temperature responsive device and extending through said end wall of said cup portion to the other side thereof.

References Cited by the Examiner
UNITED STATES PATENTS

| | | | |
|---|---|---|---|
| 2,463,427 | 3/1949 | Richards | 136—235 X |
| 2,993,944 | 7/1961 | Silver | 136—235 X |
| 3,024,295 | 3/1962 | Moore | 136—234 |
| 3,038,951 | 6/1962 | Mead | 136—235 X |
| 3,048,642 | 8/1962 | Parker | 136—235 X |

WINSTON A. DOUGLAS, *Primary Examiner.*

JOHN H. MACK, A. M. BEKELMAN, A. B. CURTIS, *Assistant Examiners.*